C. R. LOTT.
GLASS FORMING MACHINE.
APPLICATION FILED MAR. 15, 1920.
1,369,679.
Patented Feb. 22, 1921.
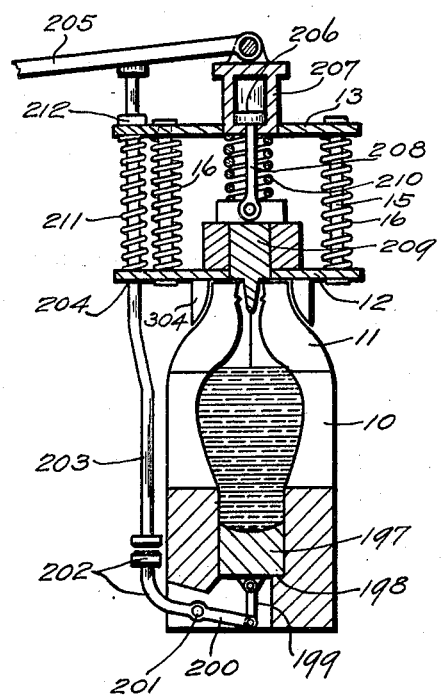
WITNESS
Leonard Soubier
INVENTOR
Clyde R. Lott.
By J. F. Rule.
His attorney.

UNITED STATES PATENT OFFICE.

CLYDE R. LOTT, OF WASHINGTON, DISTRICT OF COLUMBIA, ASSIGNOR TO THE GUARDIAN TRUST AND SAVINGS BANK OF TOLEDO, OF TOLEDO, OHIO, A CORPORATION OF OHIO.

GLASS-FORMING MACHINE.

1,369,679.  Specification of Letters Patent.  Patented Feb. 22, 1921.

Original application filed September 27, 1909, Serial No. 519,678. Divided and this application filed March 15, 1920. Serial No. 365,783.

*To all whom it may concern:*

Be it known that I, CLYDE R. LOTT, a citizen of the United States, residing at Washington, in the District of Columbia, have invented new and useful Improvements in Glass-Forming Machines, of which the following is a specification.

My invention relates to molds for glass forming machines, and means for working and shaping plastic glass in the molds.

An object of the invention is to provide improved means for forming the neck of a bottle or other article in the mold, especially in forming long necked ware. Other objects of the invention and the precise nature thereof will appear hereinafter.

The present application is a division of my co-pending application, Serial Number 519,678, filed September 27, 1909.

Referring to the accompanying drawings: The figure is a part sectional elevation of a mold and its appurtenances, constructed in accordance with the principles of my invention.

The mold as shown comprises a body portion 10, a neck mold 11 and a movable bottom 197 which rests in its lowest position against a shoulder 198 formed in the opening of the mold in which the bottom is movable.

The bottom is connected by a link 199 to one end of a lever 200 which is pivoted to the mold as at 201, and has its free end curved upwardly and headed as at 202. The headed end is adapted to be engaged by a headed end of a rod 203 slidable in bearings 204 in a follower plate or shield 12, the upper end of the rod being adapted to be engaged by an arm 205 to which a plunger 209 is indirectly connected. The arm 205 forms part of a lever actuated by a cam on the machine, as shown and described in my co-pending application above mentioned.

The arm 205 is pivoted to the top of a cylindrical casing 207 in which is a slidable piston 206, whose rod 208 is pivoted to the plunger 209. A spring 210 is arranged between the plunger and the bottom of the cylinder casing. A spring 211 encircles the rod 203, having one end engaging the plate 12 and the other end engaging a collar 212 on the rod and normally tending to move said rod upwardly. A follower plate 13 is slidably mounted on rods 15 for movement toward and from the plate 12, being yieldingly held at the limit of its upward movement by coil springs 16 surrounding the rods 15. The follower plates 12 and 13, rod 203, cylinder 207 and plunger 209, are all supported as a unit by the arm 205 and movable up and down bodily therewith. Lugs 304 on the plate 12 have their inner surfaces beveled to engage the inclined surfaces of the mold 11, and thereby form a lock for the mold.

After a charge of glass is introduced into the blank mold 10 and the neck mold 11 is brought into position thereover, the head 12 is lowered onto the neck mold, as shown in the drawings, by a downward movement of the arm 205. A continued downward movement of the arm 205 forces the rod 203 downward through the plate 12, compressing the spring 211 and operating through the lever 200 to move the mold bottom 197 upward. The glass is thereby forced upward into the neck mold when the plunger moves downward and the plunger core enters the neck mold, whereby to insure that the molten glass will fill the neck of the mold. The piston and cylinder connection between the mold and the operating arm permits a considerable degree of movement of such arm before the plunger comes into operation.

The spring 210 provides an initial yielding or elastic pressure of the plunger, which increases and may become a positive or unyielding pressure during the final movement. The construction herein shown is well adapted for making long necked ware as the upward movement of the mold bottom insures the glass being forced upward into the neck mold in sufficient volume and with sufficient pressure to insure the proper formation of the neck of the bottle. The body mold 10 may be made in horizontally separable sections which are separated after the bottle neck has been formed, leaving the blank suspended from the neck mold for further treatment, as set forth in the co-pending application above mentioned.

Modifications may be resorted to within the spirit and scope of my invention.

What I claim is:

1. The combination of a blank mold, a sliding bottom movable lengthwise of the mold and forming a closure for the mold during such movement, and a forming device at the opposite end of the mold and coöperating therewith for forming a blank during the inward movement of said bottom, said forming device being brought into its operative position in the mold before said inward movement of said bottom.

2. A mold comprising horizontally separable sections, a plunger movable toward and from the mold and comprising a core to enter one end of the mold, locking lugs carried with the core and arranged to engage and hold the mold sections locked together while the core is in position, a sliding element movable lengthwise of the mold and forming a closure for the other end of the mold during such movement, and interconnections between the plunger and said element whereby said core and locking device are in their operative position with the core projecting into the mold before said movement of said element.

Signed at Washington, in the District of Columbia, this 3rd day of March, 1920.

CLYDE R. LOTT.